(12) United States Patent
Mahieu et al.

(10) Patent No.: US 11,015,762 B2
(45) Date of Patent: May 25, 2021

(54) COMPOSITE PRESSURE VESSEL WITH BOSS CONNECTOR

(71) Applicant: PLASTIC OMNIUM ADVANCED INNOVATION AND RESEARCH, Brussels (BE)

(72) Inventors: Els Mahieu, Turnhout (BE); Geert Nouwen, Alken (BE); Philippe Willems, Hasselt (BE); Axel Seifert, Zonhoven (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 17/054,651

(22) PCT Filed: Jun. 26, 2019

(86) PCT No.: PCT/EP2019/067071
§ 371 (c)(1),
(2) Date: Nov. 11, 2020

(87) PCT Pub. No.: WO2020/002467
PCT Pub. Date: Jan. 2, 2020

(65) Prior Publication Data
US 2021/0102665 A1 Apr. 8, 2021

(30) Foreign Application Priority Data
Jun. 26, 2018 (EP) ..................... 18179930

(51) Int. Cl.
*F17C 1/16* (2006.01)
*F17C 1/06* (2006.01)

(52) U.S. Cl.
CPC .................. *F17C 1/16* (2013.01); *F17C 1/06* (2013.01); *F17C 2201/0109* (2013.01);
(Continued)

(58) Field of Classification Search
CPC ...... F17C 1/16; F17C 1/06; F17C 2203/0663; F17C 2203/066; F17C 2201/0109;
(Continued)

(56) References Cited

U.S. PATENT DOCUMENTS

| 8,967,417 B2 | 3/2015 | Sharp et al. |
| 2011/0210515 A1 | 9/2011 | Sharp et al. |

(Continued)

FOREIGN PATENT DOCUMENTS

| CN | 203023786 U | 6/2013 |
| DE | 697 21 966 T2 | 5/2004 |

(Continued)

OTHER PUBLICATIONS

International Search Report dated Feb. 14, 2020 in PCT/EP2019/067071 filed on Jun. 26, 2019.

*Primary Examiner* — Don M Anderson
(74) *Attorney, Agent, or Firm* — Oblon, McClelland, Maier & Neustadt, L.L.P.

(57) ABSTRACT

A pressure vessel for storing a fluid at high pressure includes: a liner and a composite laminate shell coupled to an outer surface of the liner. The liner has an inner surface delineating an inner wall of a cavity and the cavity includes a dome-shaped region having a central opening. An access channel is traversing the composite laminate shell for providing an access to the cavity. The central opening is facing an entrance of the access channel. A boss connector, located or partly located within the access channel, includes an inner bore part configured for receiving a valve or a plug, and an outer neck part including a plurality of interspaced rib elements protruding into the composite laminate shell for optimizing a pressure distribution in the laminate shell.

15 Claims, 7 Drawing Sheets

(52) U.S. Cl.
CPC ............................ *F17C 2203/0604* (2013.01);
*F17C 2203/066* (2013.01); *F17C 2203/0663*
(2013.01); *F17C 2205/0305* (2013.01); *F17C
2223/036* (2013.01)

(58) Field of Classification Search
CPC ...... F17C 2205/0305; F17C 2205/0302; F17C
2223/036
See application file for complete search history.

(56) References Cited

U.S. PATENT DOCUMENTS

| | | | |
|---|---|---|---|
| 2014/0144866 A1* | 5/2014 | Heo ...................... | F17C 13/002 |
| | | | 215/45 |
| 2016/0025266 A1* | 1/2016 | Leavitt ................... | F17C 1/06 |
| | | | 206/0.6 |
| 2016/0348845 A1 | 12/2016 | Bowman et al. | |
| 2017/0276294 A1 | 9/2017 | Almagro et al. | |
| 2017/0284601 A1* | 10/2017 | Kusaba ................... | F17C 1/06 |
| 2018/0172208 A1* | 6/2018 | Lee ......................... | F17C 1/06 |

FOREIGN PATENT DOCUMENTS

| | | |
|---|---|---|
| EP | 0 857 911 B1 | 5/2003 |
| JP | 2017-94518 A | 6/2017 |

* cited by examiner

COMPOSITE PRESSURE VESSEL WITH BOSS CONNECTOR

FIELD OF THE INVENTION

The present invention relates to a pressure vessel for storing a fluid at high pressure. More specifically it relates to composite vessels comprising a liner and a composite laminate shell coupled to an outer surface of the liner.

DESCRIPTION OF PRIOR ART

Composite pressure vessels for storing a fluid at high pressure, for example for storing hydrogen gas, are well known in the art.

A pressure vessel comprising a liner and a composite laminate shell coupled to an outer surface of the liner is for example described in US2016/0348845A1 or in US2017/0276294A1. An inner surface of the liner is delineating an inner wall of a cavity that can be contained with a fluid at high pressure. The vessel comprises an access channel that is traversing the composite laminate shell in order to provide for an access to the cavity for filling and un-filling the cavity with the gas. The pressure vessels known in the art also comprise a so-called boss connector. The boss connector generally comprises a cylindrical bore portion configured to receive a valve or a plug and a flange portion that is located inside the cavity and is coupled between the liner and the composite laminate shell. In any pressure vessel comprising a liner and a boss connector, a "flange" portion can be defined as the part of the boss connector which is in axial contact with the liner. The flange allows to keep the boss connector anchored when the vessel is under high pressure.

Typically, the composite laminate shell is formed by applying impregnated fibres such as carbon, glass or aramid to the outer surface of the liner using a filament winding process.

When these composite vessels are used to store pressurized hydrogen, the high pressure is for example in the range of 30 MPa to 75 MPa.

Figure 1:
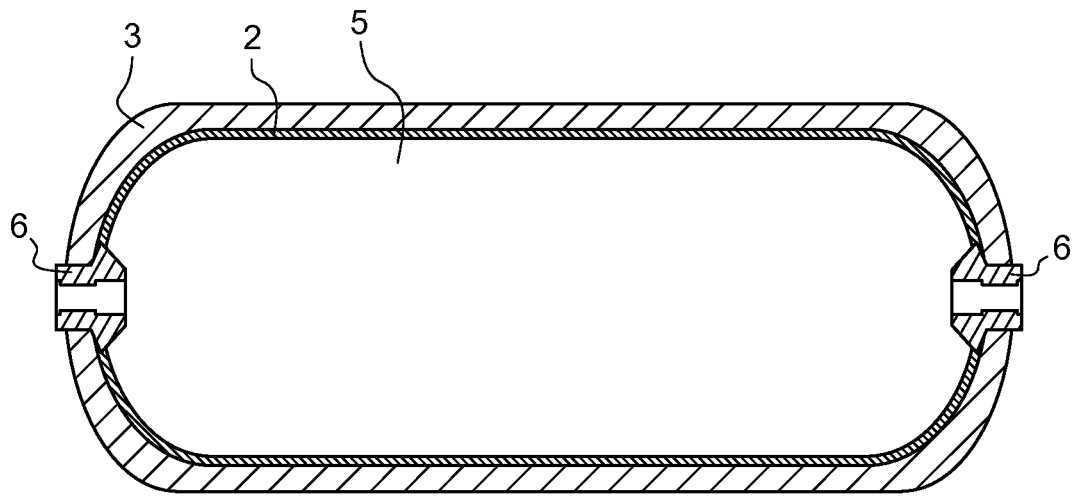

A typical example of composite pressure vessel known in the art comprising a liner 2 delineating a cavity 5, a composite laminate shell 3 and at least one boss connector 6 is schematically illustrated on FIG. 1. The wording composite pressure vessel or shortly CPV covers the pressure vessels having a composite shell surrounding a liner. The liner is generally made of a plastic material but it could also be made of a metal.

A composite vessel featuring a plastic or a metal liner with full composite overwrap is known to have a number of advantages when compared to an all-metal vessel. For example, the composite materials significantly improve a pressure vessel's corrosion resistance and overall safety. In addition, a composite vessel has generally an extended vessel's service life time. But the main advantage of a CPV is its weight. Indeed a CPV is at least three times lighter than an all-metal pressure vessel.

However, one of the problems with the current composite pressure vessels is that the flange portion of the boss connector creates a pressure distribution on the composite laminate that is not following an ideal geodesic-isotensoid shape. This decreases the efficiency of the re-enforcement action of the composite laminate around the boss connector. This requires the need to install extra composite reinforcement around the boss connector to keep the boss connector anchored when pressure is applied in the vessel. Generally this problem is mitigated by applying additional helical layers of composite laminate, thereby increasing the thickness and weight of the composite laminate shell.

A further problem with the current composite vessels is that the boss connector, which is made of a metal, is heavy.

The weight of the pressure vessel plays an important role, for example, for pressure vessels used in the vehicle industry, a lower weight will improve the fuel economy and reduce the overall vehicle weight.

Hence, there is room for improving the currently existing composite pressure vessels.

SUMMARY OF THE INVENTION

It is an object of the present invention to provide a composite pressure vessel that has a reduced weight compared to existing composite pressure vessels and wherein the efficiency of the composite laminate for acting as a reinforcement element, more particularly in the region of the boss connector, is improved.

The present invention is defined in the appended independent claims. Preferred embodiments are defined in the dependent claims.

A pressure vessel for storing a fluid at high pressure according to the invention comprises a liner and a composite laminate shell coupled to an outer surface of the liner. The liner has an inner surface delineating an inner wall of a cavity. The cavity comprises a dome-shaped region having a central opening. An access channel is traversing the composite laminate shell for providing an access to the cavity and the central opening is facing the access channel.

The pressure vessel according to the invention is characterized in that the pressure vessel comprises a boss connector located or partly located within the access channel. The boss connector comprises an inner bore portion elongating along an axial axis X and configured for receiving a valve or a plug. The boss connector further comprises an outer neck portion comprising a plurality of interspaced rib elements for optimizing a pressure distribution in the laminate shell. The rib elements are protruding into the composite laminate shell in a radial direction with respect to the axial axis X. The boss connector comprises a flange portion located between the liner and the composite laminate shell. The flange portion has an outer radial diameter $D_{FL}$. At least one of the plurality of interspaced rib elements has a radial outer diameter $D_{RM}$ with $D_{RM} \geq D_{FL}$.

An advantage of providing an outer neck portion comprising a plurality of interspaced rib elements protruding into the composite laminate shell, is that the composite laminate shell is acting more efficiently, i.e. the entire thickness of the laminate shell is used to act against the pressure exercised by the fluid on the inner wall of the liner. As a consequence, when compared to prior art pressure vessels, the extra layers of composite reinforcement around the boss connector, used in the prior art vessels as discussed above, are not needed.

An additional advantage of using the plurality of interspaced rib elements is that the size of an additional flange portion can be strongly reduced when compared to prior art flanges. That is thus why at least one rib element of the plurality of interspaced rib elements has a radial outer diameter $D_{RM}$ with $D_{RM} \geq D_{FL}$. In other words, there is at least one rib element that has an outer diameter $D_{RM}$ that is equal or larger than the outer diameter $D_{FL}$ of the flange portion. Hence the overall weight of the boss connector is reduced.

Advantageously, by using only small-sized flanges, i.e. flanges having an outer diameter equal or smaller than the outer diameter of a rib element, the shape of the cavity in the dome-shaped region of the cavity is less disturbed which, as discussed above, has a positive effect on the pressure distribution.

Preferably, the boss connector of the pressure vessel according to the invention has a radial outer diameter $D_X$, measured in a plane orthogonal to the axial axis X, that is varying along the axial axis X, and wherein the outer diameter $D_X$ has a maximum value $D_{Max}$ corresponding to a radial outer diameter of at least one of said plurality of interspaced rib elements. In other words, it is the outer radial diameter of a rib element that determines the overall radial dimension of the boss connector. If the boss connector comprises for example a flange portion or a tube extension, the outer diameters of these portions will always be equal or lower than an outer diameter of at least one of the rib elements.

The radial outer diameter $D_X$ has to be construed as a minimum diameter of a circle that is needed to make a circular contour around the boss connector in the orthogonal plane. Indeed the radial perimeter of the boss connector is not necessary a circle, but can be for example an ellipse or any other shape.

SHORT DESCRIPTION OF THE DRAWINGS

Figure 2A:
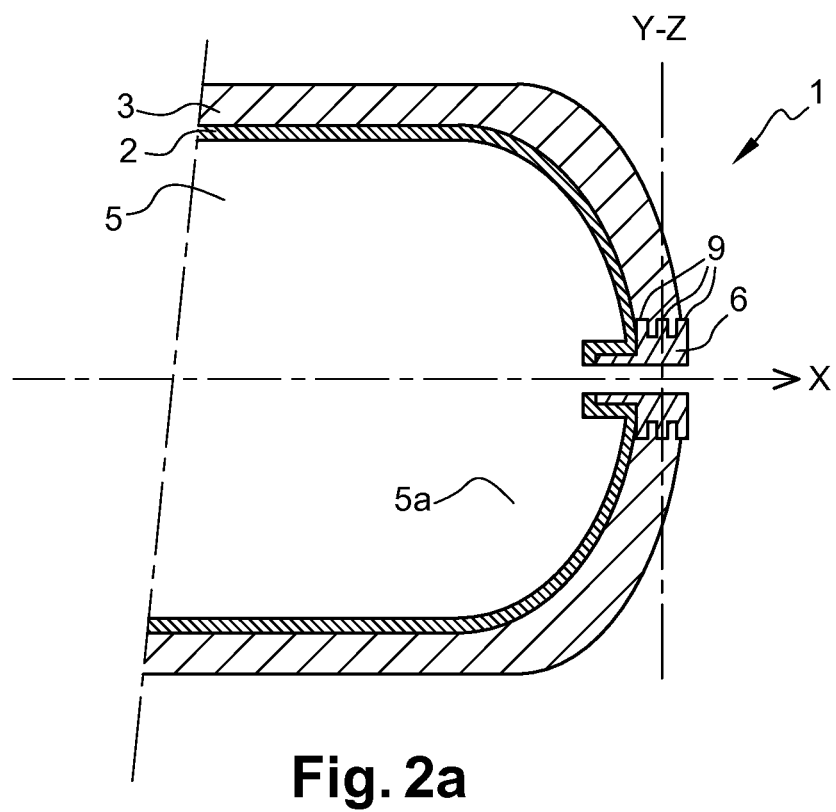
Figure 2B:
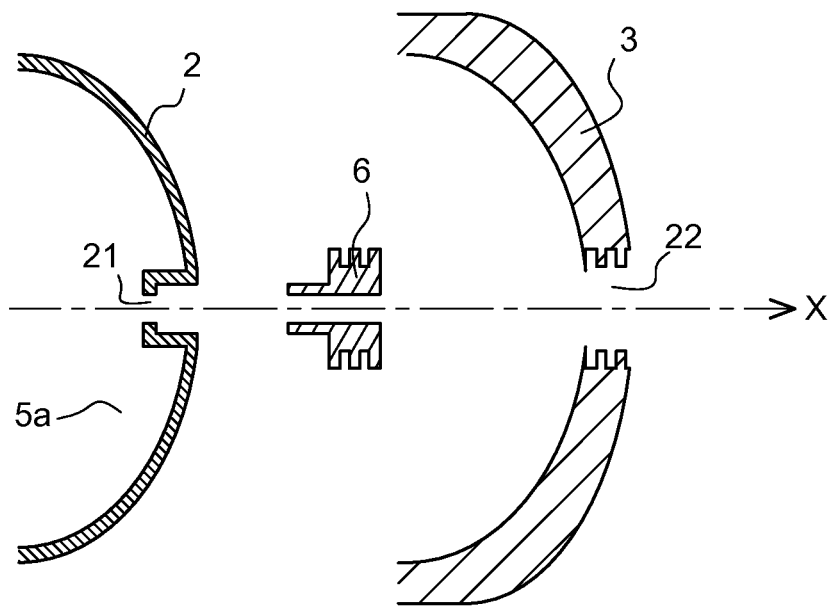
Figure 3:
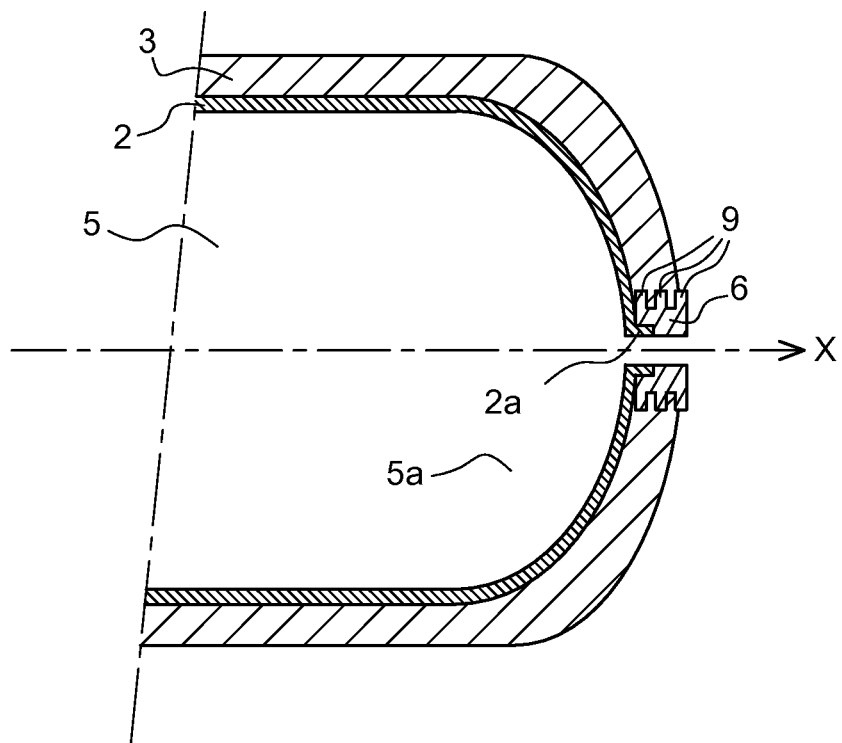
Figure 4:
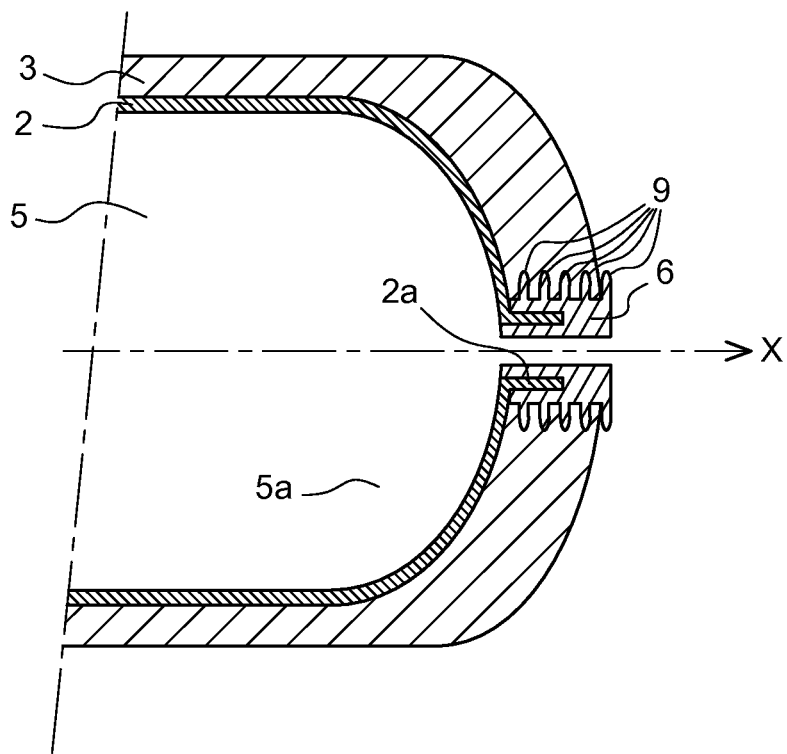
Figure 5:
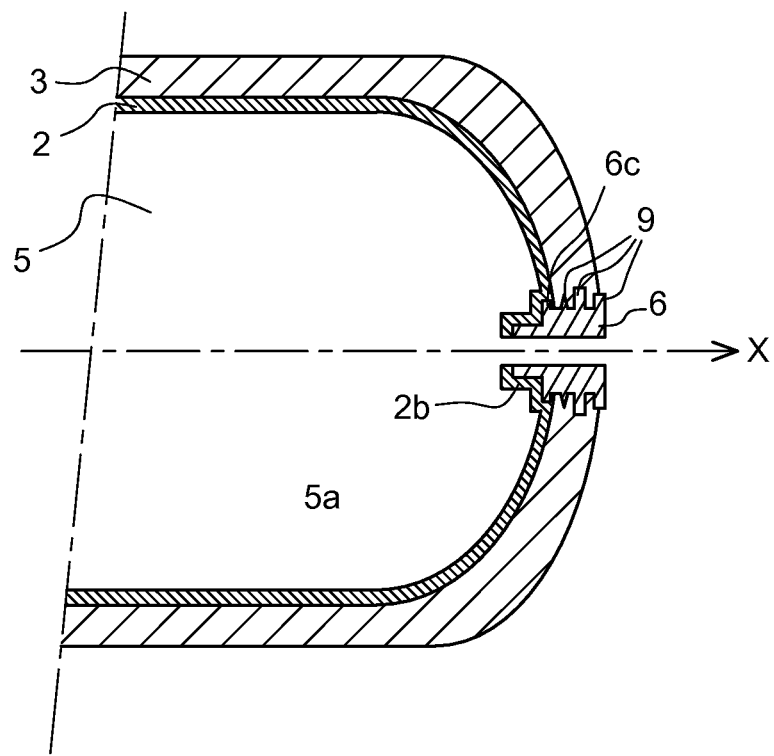
Figure 6A:
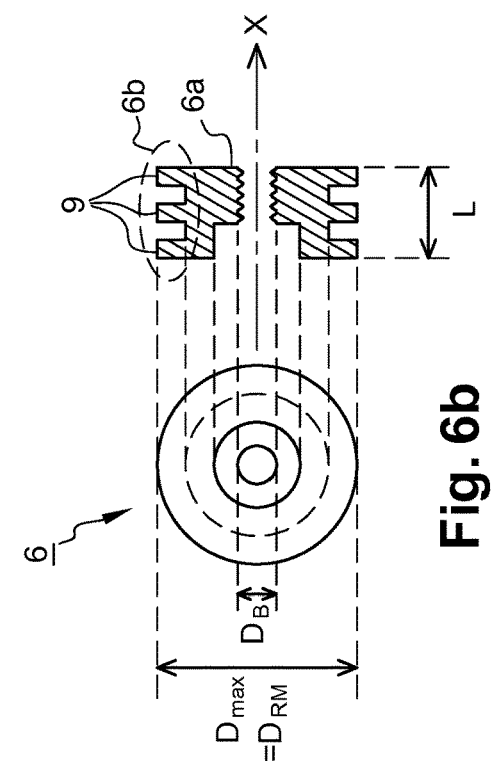
Figure 6B:
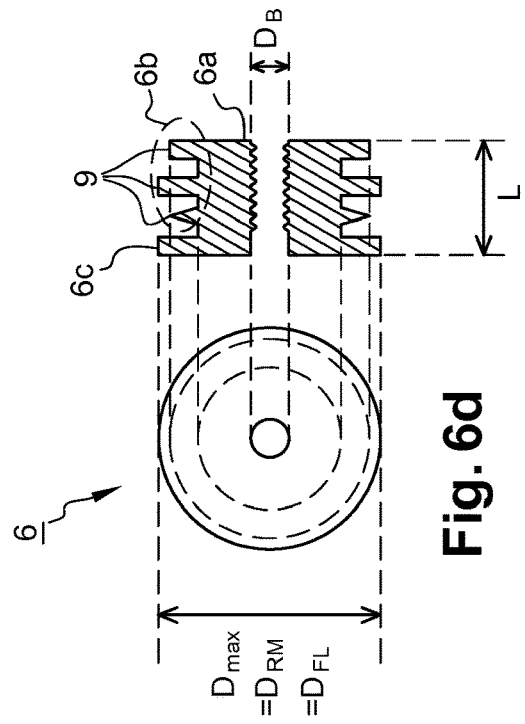
Figure 6C:
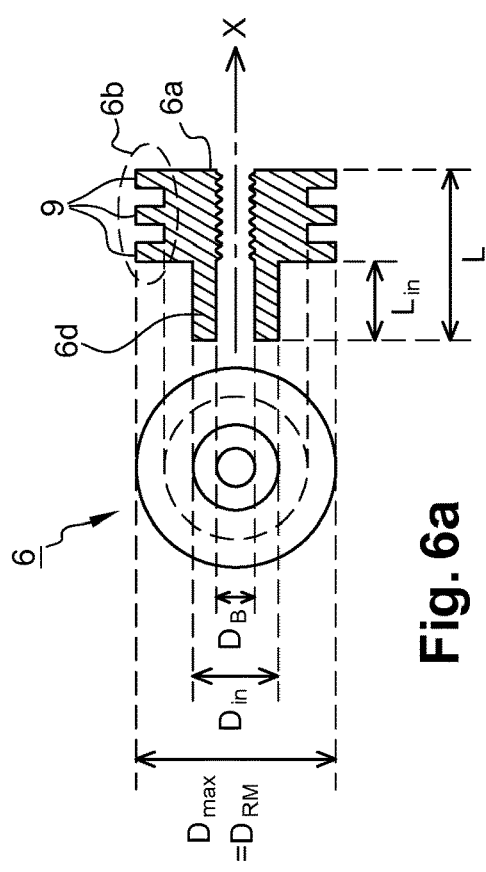
Figure 6D:
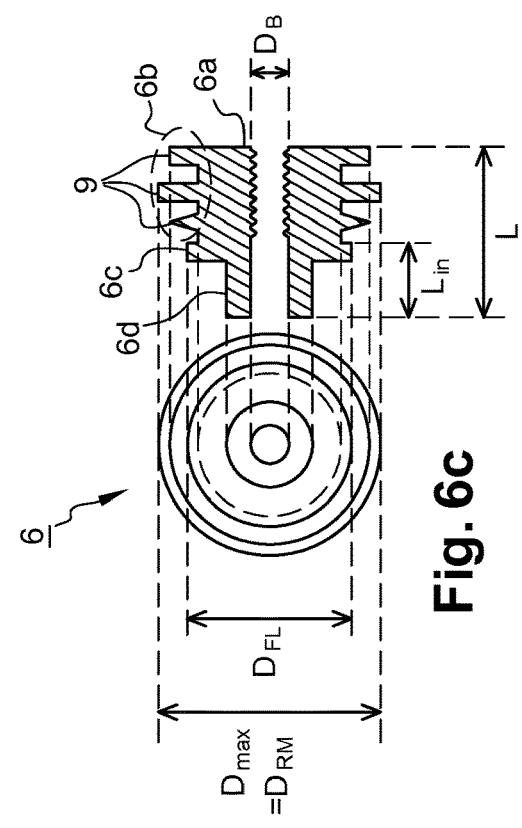
Figure 6E:
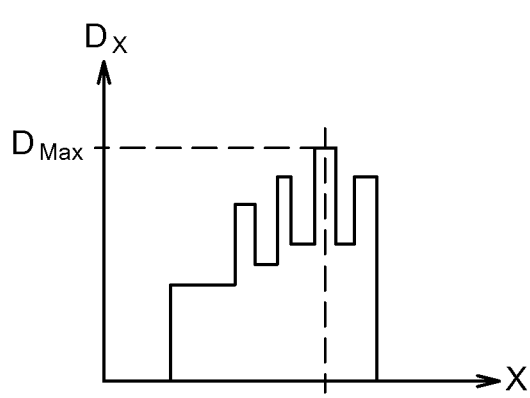
Figure 7:
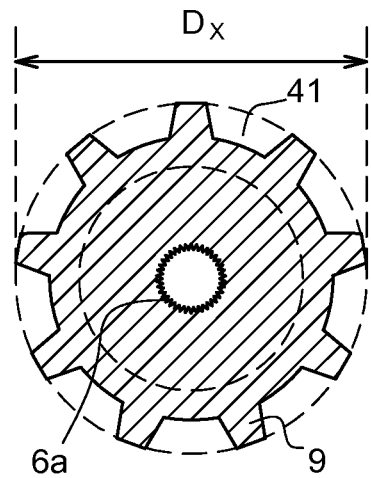
Figure 8:
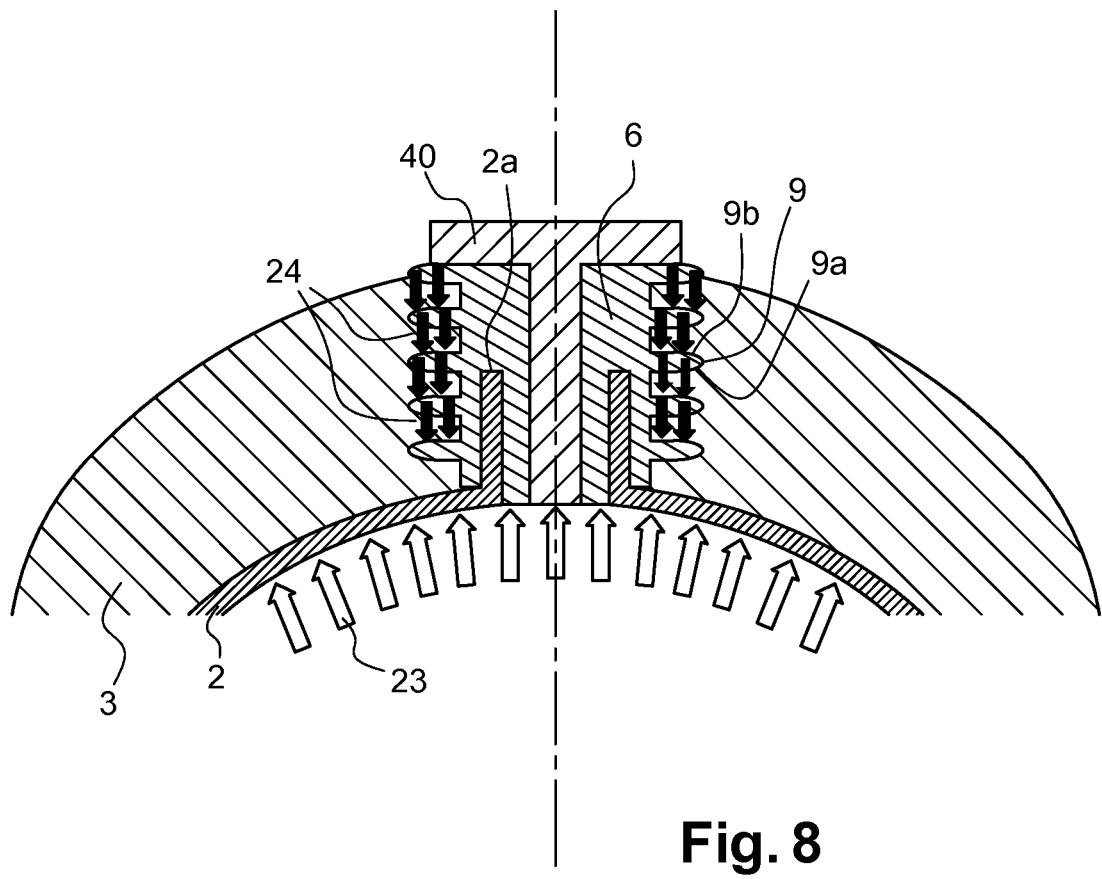
Figure 9D:
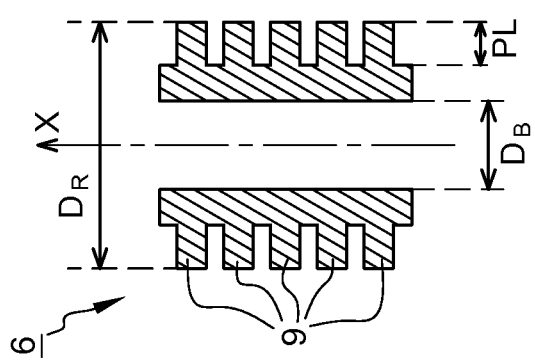
Figure 9C:
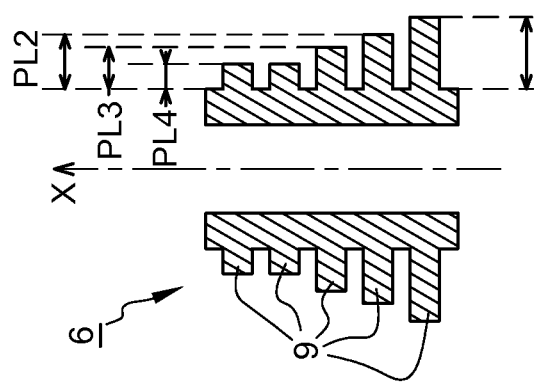
Figure 10B:
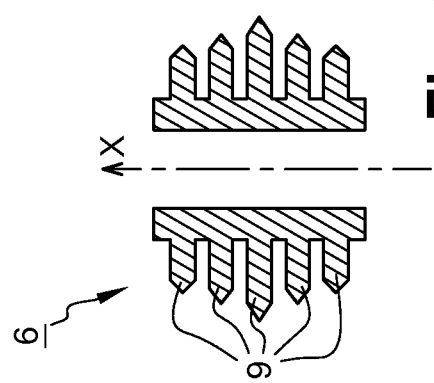
Figure 9B:
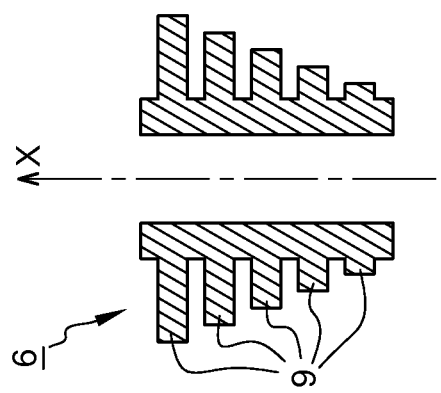
Figure 10A:
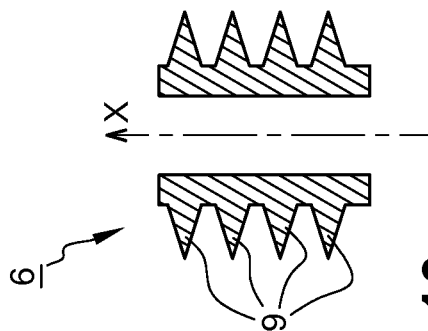
Figure 9A:
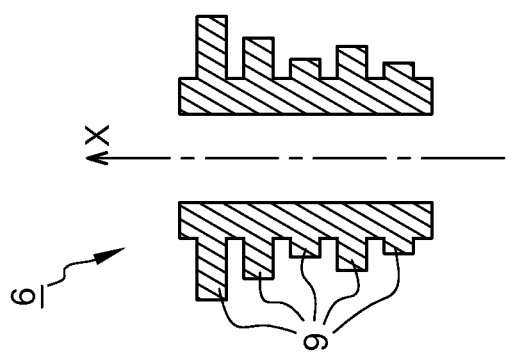
Figure 11A:
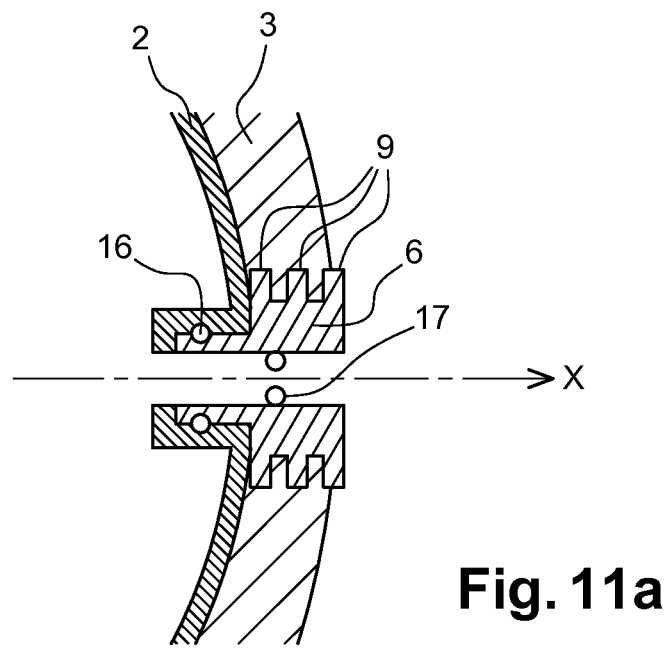
Figure 11B:
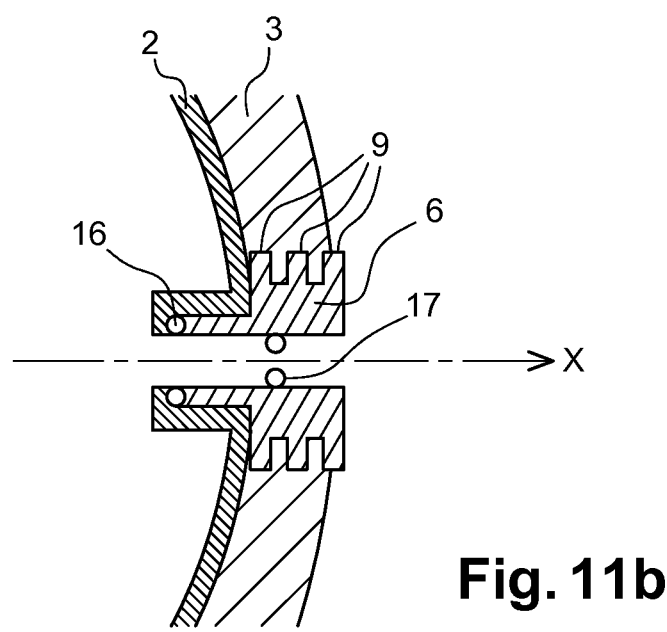

These and further aspects of the invention will be explained in greater detail by way of example and with reference to the accompanying drawings in which:

FIG. 1 shows a cross sectional view of a prior art composite pressure vessel,

FIG. 2a shows a cross sectional view of a part of pressure vessel according to the invention, FIG. 2b shows an expanded view of a part of a liner, a boss connector and a part of a composite laminate shell, FIG. 3 shows a cross sectional view of a part of an embodiment of a pressure vessel according to the invention, FIG. 4 shows a cross sectional view of a part of an alternative embodiment of a pressure vessel according to the invention, FIG. 5 shows a cross sectional view of a part of a pressure vessel according to the invention wherein the boss connector comprises a small flange, FIG. 6a shows a projection of a boss connector comprising a tube extension, FIG. 6b shows a projection of a boss connector without a flange, FIG. 6c shows a projection of a boss connector comprising a tube extension and a small flange, FIG. 6d shows a projection of a boss connector comprising a small flange, FIG. 6e illustrates a variation of a radial outer diameter $D_X$ of the boss connector of FIG. 6c, FIG. 7 shows a cross sectional view along a Y-Z plane of the boss connector shown on FIG. 2a, FIG. 8 schematically illustrates pressure distributions in a pressure vessel according to the invention, FIG. 9a schematically illustrates a cross section of a first boss connector according to the invention, FIG. 9b schematically illustrates a cross section of a second boss connector according to the invention, FIG. 9c schematically illustrates a cross section of a third boss connector according to the invention, FIG. 9d schematically illustrates a cross section of a fourth boss connector according to the invention, FIG. 10a schematically illustrates a cross sectional view of an example of boss connector according to the invention, FIG. 10b schematically illustrates a cross sectional view of a further example of a boss connector according to the invention, FIG. 11a schematically illustrates the provision of a seal to the boss connector, FIG. 11b schematically illustrates a further example of a provision of a seal to the boss connector.

The figures are not drawn to scale. Generally, identical components are denoted by the same reference numerals in the figures.

DETAILED DESCRIPTION OF PREFERRED EMBODIMENTS

A pressure vessel for storing a fluid at high pressure comprises a liner 2, a composite laminate shell 3 made of several composite laminate layers and a boss connector 6. These components of the pressure vessel are generally known in the art and shown on FIG. 1, illustrating a prior art pressure vessel.

The liner 2 has an inner surface that is delineating an inner wall of a cavity 5. The liner is designed to prevent any leakage of the fluid that is being contained in the cavity of the pressure vessel. The liner 2 is generally made of a plastic material such as a polymer. In other embodiments, the liner can be of a metal, for instance aluminium.

The composite laminate shell 3 is coupled to an outer surface of the liner. This composite laminate shell is designed to withstand internal pressure loads which would cause the vessel to expand. The composite laminate shell restricts the expansion and absorbs the internal stress caused by the pressure load.

The composite laminate shell 3 typically comprises carbon fibres embedded in a polymer matrix. A technique of filament winding is used for example for manufacturing the composite laminate shell.

Various embodiments of a pressure vessel according to the invention are schematically illustrated on FIG. 2a to FIG. 6d.

In order to provide an access to the cavity for filling and un-filling the cavity with the fluid, an access channel 22 traversing the composite laminate shell 3 is provided. This is schematically illustrated on FIG. 2b where an expanded view of a part of a liner, a boss connector and a part of a composite laminate shell according to the invention is shown.

The cavity 5 of the pressure vessel according to the invention, as illustrated on FIG. 2a and FIG. 2b, comprises a dome-shaped region 5a having a central opening 21. The central opening 21 can be construed as an oculus of the dome shaped region 5a. The central opening 21 is facing the access channel 22. Indeed, the cavity delineated by the liner 2 is not a closed cavity but there is at least one opening for filling and un-filling the cavity with the fluid. This opening corresponds to the central opening in the dome-shaped part of the cavity. Generally the dome-shaped region corresponds to a geodesic dome shape or to a geodesic-isotensoid shape.

The pressure vessel 1 according to the invention comprises a boss connector 6 that is located or partly located within the access channel 22. In embodiments, as illustrated on FIG. 3 and FIG. 4, the boss connector can be entirely located within the access channel of the composite laminate shell. In other embodiments, as illustrated on FIG. 2a and FIG. 5, the boss connector 6 is partly located in the access channel of the composite laminate shell 3 and partly extending outside the composite laminate shell 3.

As further illustrated on FIG. 6a to FIG. 6d, the boss connector 6 according to the invention comprises an inner bore portion 6a and an outer neck portion 6b. The inner bore portion 6a is elongating along an axial axis X and configured for receiving a valve or a plug. The bore portion 6a has generally the shape of a hollow cylinder.

In embodiments the inner bore portion 6a comprises for example a thread that allows to screw the valve or the plug 40 into the inner bore part 6a of the boss connector 6.

The outer neck portion 6b comprises a plurality of interspaced rib elements 9 that are protruding into the composite laminate shell 3. In this way, the boss connector 6 is coupled with the composite laminate shell 3. As illustrated on FIG. 2a to FIG. 6, the rib elements 9 are protruding into the composite laminate shell in a radial direction with respect to the axial axis X. As illustrated on FIG. 8, the rib elements 9 of the plurality of interspaced rib elements 9 have first axial contact surfaces 9a turned towards the liner 2 and second axial contact surfaces 9b opposite to the first axial contact surfaces 9a. The first axial contact surfaces 9a and the second axial contact surfaces 9b respectively contact with layers of the composite laminate shell 3 in an axial direction with respect to the axial axis X. It is the second axial contact surfaces 9b of the rib elements 9 of the plurality of interspaced rib elements 9 that carry the layers of the composite laminate shell that withstand the internal pressure loads.

Remark that the thickness of a rib element 9 having a first axial contact surface 9a and a second axial contact surface 9b is the distance between the first axial contact surface 9a and the second axial contact surface 9b.

The plurality of interspaced rib elements 9 according to the invention is suitable for optimizing a pressure distribution in the laminate shell. Indeed, due to the plurality of interspaced rib elements 9, the interface surface between the boss connector and the composite laminate is increased. The pressure on the internal surface of the liner 2 in the vicinity of the boss connector 6, as schematically illustrated with arrows 23 on FIG. 8, and which is caused by the pressure of the fluid inside the cavity, should be equal to a counteracting pressure from the composite laminate shell, illustrated by black arrows 24 on FIG. 8. Due to the plurality of interspaced rib elements 9, the efficiency of the composite laminate shell for counter acting the pressure on the inner wall of the cavity, is improved as the composite laminate shell is now fully efficient over its entire cross section of the composite laminate shell. On the other hand, with the prior art composite vessels mainly the layers of the composite laminate shell that are close to the liner vessel are efficient for counter acting to the internal pressure in the cavity.

The boss connector 6 has a radial outer diameter $D_X$ measured in a plane orthogonal to the axial axis X and this radial outer diameter $D_X$ is varying along the axial axis X. This variation of the radial outer diameter is schematically illustrated on FIG. 6e for an exemplary boss connector shown on FIG. 6c. The outer diameter $D_X$ has a maximum value $D_{Max}$ corresponding to a radial outer diameter of at least one of said plurality of interspaced rib elements. In other words, the maximum value $D_{Max}$ of the outer radial diameter of the boss connector is determined by at least one of the plurality of interspaced rib elements. Hence, the outer diameter $D_X$ has a maximum value $D_{Max}$ at a location where the orthogonal plane is crossing one of the plurality of interspaced rib elements. Indeed, as illustrated with the embodiments shown in FIG. 6a to FIG. 6d, the maximum radial outer diameter of the boss connector 6 is always determined by an outer diameter of a rib element.

Remark that the radial perimeter of the boss connector is not necessary a circle, but can for example be an ellipse or any other shape as for example illustrated on FIG. 7 showing a radial perimeter of an exemplary boss connector at a location of a rib element. Hence, the radial outer diameter $D_X$ has to be construed as a minimum circular diameter that is needed to make a circular contour around the boss connector in the orthogonal plane. Such a minimum outer circle for determining the outer diameter $D_X$ is shown in FIG. 7 with a dotted line.

In embodiments according to the invention, as illustrated on FIG. 5, the boss connector 6 comprises a flange portion 6c located between the liner 2 and the composite laminate shell 3. The flange portion 6c comprises an axial contact surface contacting with the liner 2 in an axial direction with respect to the axial axis X. The axial contact surface of the flange portion 6c is outside of the tubular end portion 2a. The flange portion has an outer radial diameter DEL and at least one of the plurality of interspaced rib elements 9 has a radial outer diameter $D_{RM}$ with $D_{RM} \geq D_{FL}$. In other words, there is always a rib element that has a radial outer diameter that is equal or larger than the outer diameter of the flange portion 6c. The diameter of the flange portion and the measurement of the diameter of the flange portion is to be construed the same way as the outer diameter $D_X$ and the measurement of the outer diameter $D_X$ as discussed above.

The boss connectors shown on FIG. 6a to FIG. 6d have a length L measured along the axial direction.

In the example shown on FIG. 6a, the outer neck portion 6b of the boss connector comprises three interspaced rib elements 9. This exemplary boss connector 6 also comprises a tube extension 6d for entering the cavity as illustrated on FIG. 2a. The tube extension has a length $L_{in}$, measured along the axial axis X and an outer diameter $D_{in}$. The boss connector shown on FIG. 6a does however not comprise a flange portion. As illustrated on FIG. 6a, the maximum radial outer diameter $D_{Max}$ of the boss connector corresponds to an outer diameter $D_{RM}$ measured in a plane crossing one of the three rib elements 9. In this example, the three rib elements have the same outer diameter.

In FIG. 6b a further embodiment of a boss connector 6 according to the invention is shown that is not comprising a flange portion. This exemplary boss connector does not comprise a tube extension neither and the entire boss connector can be located in the composite laminate shell 3 as illustrated on FIG. 3. In this example, the maximum radial outer diameter $D_{Max}$ of the boss connector corresponds to an outer diameter $D_{RM}$ measured in a plane crossing one of the three rib elements 9.

In FIG. 6c a boss connector 6 according to the invention comprising a small flange portion 6c, three rib elements 9 and a tube extension 6d is shown. As illustrated on FIG. 5, the flange portion 6c is a portion that is located between the liner 2 and the composite laminate shell. As illustrated on FIG. 6d, in this example, the outer diameter of the flange portion 6c is smaller than the outer diameter of each of the three rib elements. A maximum value $D_{Max}$ for the radial outer diameter D is obtained at a position of the middle rib element which has the largest outer diameter of all three rib elements.

A further example of a boss connector 6 according to the invention comprising a flange portion 6c is shown on FIG. 6d. As illustrated on FIG. 6d, the outer diameter of the flange portion 6c is, in this example, equal to the outer diameter of one of the three rib elements, namely the middle rib element. In this example, the maximum value $D_{Max}$ for the radial outer diameter of the boss connector corresponds to the radial outer diameter of the middle rib element and also corresponds to the outer radial diameter of the flange portion.

A further advantage of the pressure vessel according to the invention, when compared to for example the prior art composite vessel shown on FIG. 1, is that the pressure distribution, in the vicinity of the boss connector 6, is improved. Indeed, as discussed above, when using a prior art boss connector having a large flange portion, the pressure distribution acting on the composite laminate does not follow the ideal geodesic-isotensoid shape. This results in a further decrease of reinforcement efficiency of the composite laminate shell. On the other hand, for the pressure vessels according to the invention, there is no flange portion or the flange portion is very small, i.e. it is smaller than the outer diameter of at least one rib element. Hence, the perturbation of the pressure distribution is minimized. Preferably, the axial contact surface of the flange portion 6c is lower than the sum of the second axial contact surfaces 9b of the rib elements 9 of the plurality of interspaced rib elements 9. This is achieved by the fact that the internal pressure loads are better transferred and distributed into the layers of the composite laminate shell thanks to the interspaced rib elements 9 that act as "stress take-up" means (see FIG. 8).

In some embodiments, as discussed above and illustrated for example on FIG. 6d and FIG. 5, the boss connector 6 comprises a tube extension 6d protruding into the central opening 21 of the dome shaped region of the cavity. In this embodiment, as shown on FIG. 5, the liner has an inner neck portion 2b surrounding the tube extension 6d of the boss connector 6.

In embodiments, the dome-shaped region 5a is preferably a convex region. In FIG. 3 and FIG. 4, examples of pressure vessels according to the invention are shown wherein the dome-shaped region 5a is convex.

In preferred embodiments, the boss connector 6 comprises an anti-rotation member for reducing a rotational movement of the boss connector with respect to the composite laminate shell.

Various means exist for forming an anti-rotation member. In some embodiments, the anti-rotation member is formed by one or more additional elements coupled to the outer neck part 6b.

In preferred embodiments, the anti-rotation member is obtained by providing one or more rib elements of the plurality of interspaced rib elements having an optimized shape for acting against rotation. When making a cross-section between a rib element and a plane orthogonal to the axial axis X, various types of perimeters can be observed, depending on the detailed embodiment of the rib element. For example, such a perimeter can be circular, elliptical, polygonal, serrated or indented. In other embodiments, the perimeter can have a shape that is formed by a combination of the shapes mentioned above.

In FIG. 7, a cross sectional view of a rib element comprising indentations is shown. In this example, the rib element 9 comprises a plurality of peripheral indentations 41. In this example nine indentations are shown. When fibres are applied around the liner and the boss connector to form the composite laminate shell, some fibres will fill in the indentations and act as stops against the rotational movement of the boss connector with respect to the composite laminate shell.

In embodiments, the rib elements 9 have a ring shape. In other words, each of the rib elements is intruding in the composite laminate shell over an angle of 360°.

In FIG. 9a to FIG. 9d a number of embodiments of various type of boss connectors 6 according to the invention are schematically shown. As illustrated, the protruding length PL of the rib elements 9 is not necessary the same for each of the rib elements of the outer neck part 6b of the boss connector 6. In some embodiments, as illustrated on FIG. 9b, FIG. 9c and FIG. 9d, the rib elements 9 have various protruding lengths PL1, PL2, PL3, PL4.

The rib elements can comprise various types of edges for protruding in the laminate shell, for example the rib elements can comprise rounded protruding edges or chamfer protruding edges. In FIG. 10a and FIG. 10b, examples of boss connectors 6 wherein the rib elements 9 have triangular protruding edges are shown.

The outer neck part 6b according to the invention is not limited by the number of interspaced rib elements 9. In preferred embodiments the number of interspaced rib elements 9 is comprised between two and ten, preferably between three and eight.

In embodiments, as illustrated on FIG. 3, FIG. 4 and FIG. 8, the liner 2 comprises a tubular end portion 2a extending along the axial axis X and the boss connector 6 comprises a recess for receiving the tubular end portion 2a. In this way, the tubular end portion 2a of the liner protrudes in the boss connector.

The invention is not limited to the number of boss connectors a pressure vessel can contain. Typically, the pressure vessel comprises two boss connectors aligned along the axial axis X.

The boss connector is made of a metal such as for example aluminium or steel and can be manufactured by standard metalworking techniques. An optional surface treatment can be applied to the boss connector so as to improve the adhesion with the laminate and/or prevent hydrogen corrosion for example.

Before the carbon fibres, forming the composite laminate shell, are wound around the liner and the boss connector, the liner and boss connector are first attached together. Typically, the attachment between the liner and the boss is made by using glue, or by providing a thread to the liner and the boss or by using a click-type or other mechanical type of connection.

To assure that the pressure vessel is gas tight, a seal, such as for example an O-ring, is placed between the liner and the boss connector. The location to place the seal depends on the specific embodiment of the boss connector. For example for the boss connector discussed above and shown on FIG. 6a a seal 16 can be positioned between the liner and the boss connectors at different locations. This is illustrated on FIG. 11a and FIG. 11b where two exemplary locations to position the seal 16 are shown. Locating and placing a seal 16 between the liner and a boss connector according to the invention is known to the person skilled in the art.

As also known in the art, when placing a valve or a plug in the bore portion of the boss connector, a further seal 17 is used, as illustrated on FIG. 11a and FIG. 11b.

The present invention has been described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of this disclosure. Use of the verb "to comprise", as well as the respective conjugations, does not exclude the presence of elements other than those stated. Use of the article "a", "an" or "the" preceding an element does not exclude the presence of a plurality of such elements.

The invention claimed is:

1. A pressure vessel for storing a fluid at high pressure, comprising:
   a liner having an inner surface delineating an inner wall of a cavity, and wherein said cavity comprises a dome-shaped region having a central opening;
   a composite laminate shell coupled to an outer surface of said liner; and
   an access channel traversing said composite laminate shell for providing an access to said cavity, and wherein said central opening is facing said access channel,
   wherein said pressure vessel comprises a boss connector located or partly located within said access channel, said boss connector comprising:
   an inner bore portion elongating along an axial axis and configured for receiving a valve or a plug,
   an outer neck portion comprising a plurality of interspaced rib elements for optimizing a pressure distribution in said laminate shell, and wherein said rib elements are protruding into said composite laminate shell in a radial direction with respect to said axial axis, and
   a flange portion having an outer radial diameter ($D_{FL}$) and being located between the liner and the composite laminate shell, and wherein at least one of said plurality of interspaced rib elements has a radial outer diameter ($D_{RM}$) wherein, said radial outer diameter ($D_{RM}$) of said at least one of said plurality of interspaced rib elements is greater than or equal to said outer radial diameter ($D_{FL}$) of said flange portion.

2. The pressure vessel according to claim 1, wherein said boss connector has a radial outer diameter ($D_x$) measured in a plane orthogonal to said axial axis and wherein said radial ($D_x$) is varying along said axial axis and having a maximum value ($D_{Max}$) corresponding to a radial outer diameter of at least one of said plurality of interspaced rib elements.

3. The pressure vessel according to claim 1, wherein said boss connector comprises a tube extension protruding into said central opening.

4. The pressure vessel according to claim 1, wherein said dome-shaped region is a convex region.

5. The pressure vessel according to claim 1, wherein said boss connector comprises an anti-rotation member for reducing a rotational movement of the boss connector with respect to the composite laminate shell.

6. The pressure vessel according to claim 1, wherein a cross-section between one of said rib elements and a plane orthogonal to said axial axis has a perimeter that is circular, elliptical, polygonal, serrated, indented or a combination of any of these shapes.

7. The pressure vessel according to claim 1, wherein one or more of said rib elements comprise rounded protruding edges, chamfer protruding edges, triangular-shaped protruding edges or protruding edges having a shape of any type of polygon.

8. The pressure vessel according to claim 1, wherein said rib elements have various protruding lengths.

9. The pressure vessel according to claim 1, wherein said outer neck portion comprises between two and ten of said interspaced rib elements.

10. The pressure vessel according to claim 1, wherein said liner is made of a plastic material or the liner is made of a metal.

11. The pressure vessel according to claim 1, wherein said composite laminate shell comprises carbon fibers embedded in a polymer matrix.

12. The pressure vessel according to claim 1, wherein said boss connector is made of a metal.

13. The pressure vessel according to claim 1, wherein said liner comprises a tubular end portion extending along said axial axis and wherein said boss connector comprises a recess for receiving said tubular end portion.

14. The pressure vessel according to claim 1, comprising a further boss connector aligned along said axial axis.

15. The pressure vessel according to claim 1, wherein said flange portion comprises an axial contact surface contacting with said liner in an axial direction with respect to said axial axis, wherein the rib elements of the plurality of interspaced rib elements have first axial contact surfaces turned towards said liner and second axial contact surfaces opposite to said first axial contact surfaces, said second axial contact surfaces contact with layers of said composite laminate shell in an axial direction with respect to said axial axis, and wherein said axial contact surface of said flange portion is lower than the sum of said second axial contact surfaces of the rib elements of the plurality of interspaced rib elements.

* * * * *